UNITED STATES PATENT OFFICE.

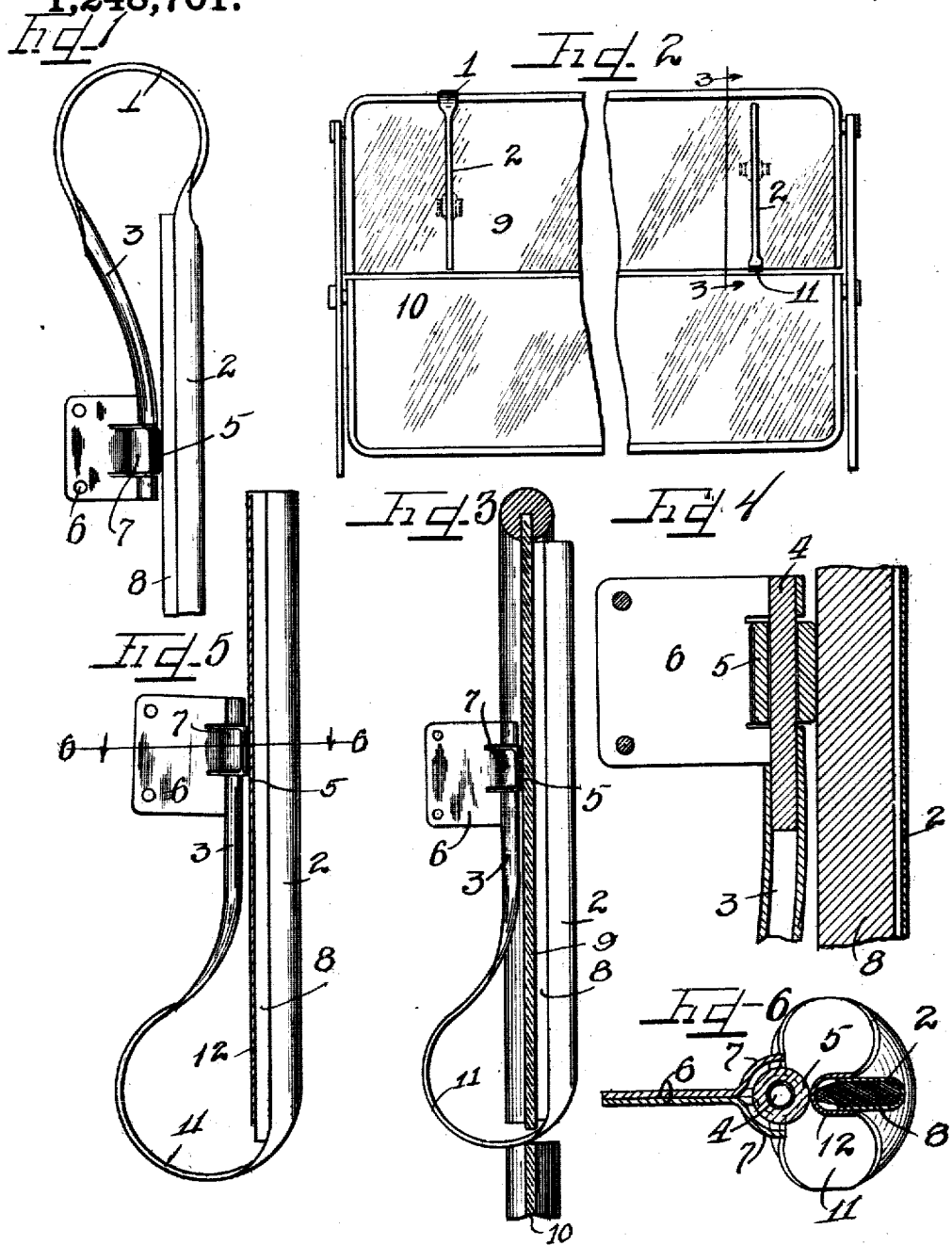

RAYMOND H. OWEN, OF CHICAGO, ILLINOIS, ASSIGNOR TO U AUTO C CORPORATION, OF NEW YORK, N. Y., A CORPORATION OF NEW YORK.

WIND-SHIELD CLEANER.

1,248,701.      Specification of Letters Patent.      Patented Dec. 4, 1917.

Application filed March 10, 1916, Serial No. 83,264. Renewed May 17, 1917. Serial No. 169,342.

*To all whom it may concern:*

Be it known that I, RAYMOND H. OWEN, a citizen of the United States, and a resident of the city of Chicago, in the county of Cook and State of Illinois, have invented certain new and useful Improvements in Wind-Shield Cleaners; and I do hereby declare that the following is a full, clear, and exact description of the same, reference being had to the accompanying drawings, and to the numerals of reference marked thereon, which form a part of this specification.

The chief difficulty experienced by persons driving an automobile in stormy weather, is the accumulation of rain, sleet or snow on the outer surface of the windshield, thus preventing a clear view of the road ahead. Attempts have been made to overcome this difficulty by constructing what is commonly known as a rain or clear vision windshield constructed in two sections, each of which may be tilted at an angle, so that with the upper glass tilted outwardly a slight amount, a narrow space of a width depending upon the adjustment of the upper glass section, is afforded, through which the driver may view the road ahead. It has been demonstrated, however, that rain or snow drifts through even a very small gap or space between the windshield sections to a great extent, so that the occupants of the car are only slightly protected from the weather. It is only by the provision of a windshield cleaner of some type or another operating over the outer surface of the windshield, that an absolutely clear vision is afforded the driver, without permitting entrance of rain or snow, as the case may be, upon the passengers in the front seat of the car. The attachment of a windshield cleaner upon a windshield is sometimes difficult, if not impossible, if the usual automobile top is in place and sealed along the upper edge of the windshield.

Accordingly, it is an object of this invention to construct a windshield cleaner which is universally adaptable for connection and use upon practically any type of windshield, either the one-piece glass or the clear-vision type, capable of being attached in more than one manner, according to the particular construction of the windshield. That is to say, the windshield cleaner may be connected over the upper edge of the windshield and operated from the inner side thereof to sweep over the exterior surface of the windshield or, where a clear-vision windshield is used, and the upper end sealed to the usual protective top on the automobile, the cleaner is constructed whereby the interior mechanisms thereof and the exterior mechanisms are connected by a thin strip of metal extending through the slot between the upper and lower sections of the clear-vision shield.

It is also an object of this invention to construct a windshield cleaner adapted to be connected upon any type of windshield without the use of clamps, screws, bolts or the like, and operating efficiently to clean the exterior surface of the shield.

It is also an object of this invention to construct a windshield cleaner adaptable for use with any type of windshield, either one piece or rain-vision, adapted to be readily attached thereon without the use of screws, bolts, or clamping devices, and operatable from the inner side of the windshield to effectually clean the outer surface thereof.

It is furthermore an object of this invention to construct a windshield cleaner embracing a resilient strip of metal bent to afford inner and outer mechanisms, the outer mechanism operatable over the exterior surface of the windshield by movement of the interior mechanism on the inner side of the windshield, and the entire device slidable along on the windshield to effectually clean the exterior surface thereof.

It is finally an object of this invention to provide a device simple in construction and operation consisting of few parts easy to manufacture and assemble, and readily attachable and detachable from the windshield.

The invention (in a preferred form) is illustrated in the drawings and hereinafter more fully described.

In the drawings:

Figure 1 is a side elevation of one type of device embodying the principles of my invention.

Fig. 2 is a fragmentary exterior view of the windshield illustrating two devices embodying the principles of my invention attached thereon.

Fig. 3 is a fragmentary detail section taken on line 3—3 of Fig. 2.

Fig. 4 is a sectional detail at one end of the device of the operating mechanisms thereof.

Fig. 5 is a view of the device shown in Fig. 3, with a guard thereon shown in section.

Fig. 6 is a section taken on line 6—6 of Fig. 5.

As shown in the drawings:

The form of device shown in Fig. 1, consists of a one-piece strip or bar of metal having a central curved flat portion 1, with one end bent to form a channel 2, and the other end bent to form a tubular portion 3, with said respective channel and tubular end portions normally impelled toward one another by resiliency of the flat portion 1. As shown in detail in Fig. 4, inserted into the tubular end portion is a pin 4, on which is journaled a fiber roller 5, and engaged rigidly on said pin to maintain the roller properly positioned thereon, is a wing plate or handle 6, consisting of two sheets of metal riveted to one another and each provided with an integral outwardly bent extension 7, to afford a guard for the roller 5, to prevent contact therewith by the fingers of an operator using the device. Secured in the channel portion 2, is a rubber squeegee 8, adapted to bear upon the exterior surface of the glass when the device is attached over the upper edge of a windshield section 9, such as shown in Fig. 2, the lower section of the windshield being denoted by the reference numeral 10. The curved band portion 1, of the device fits around the molding along the upper edge of the windshield, permitting the device to be moved horizontally over practically the entire surface of the upper windshield section to effectually clear the exterior surface thereof, of rain, sleet, or snow accumulating thereon.

The second form of my device is shown connected through the gap or slot between the windshield sections 9 and 10, of the windshield, in this instance the band or curved flat portion of the device being denoted by the reference numeral 11, and differing from the construction illustrated in Fig. 1, only in the relation of the portion 11, to the channel portion 2. In this latter construction, the curvature of the flanged portion is almost entirely at one side of the channel portion 2, permitting the squeegee to fit closely against the glass with the band portion 11, inserted in the gap between the windshield sections, as clearly shown in detail in Fig. 3.

A guard for the squeegee, adaptable for use on either of the types shown, is provided, and consists of a metal channel 12, adapted to be engaged over the rubber squeegee 8, extending over the margins of the channel portion 2, clamping resiliently thereon, to protect the squeegee when the device is not in use, said guard being removable by merely withdrawing the same longitudinally along the channel portion 2, out of engagement therewith.

The operation is as follows:

The form of my device illustrated in Fig. 1, is, as pointed out, attachable over the upper edge of the windshield and is capable of being moved slidably therealong to clean the exterior surface of the windshield by movement of the rubber squeegee 8, thereover, the operator using the wing plate 6, on the interior side of the windshield for the purpose. The resiliently acting flat metal bar portion 1, serves to retain the squeegee 8, pressed against the outer surface of the windshield glass, and the roller 5, against the inner surface of the glass and rolling upon the glass to permit easy movement of the device.

The form of device illustrated in Figs. 3, 5, and 6, is more particularly adapted for use upon clear-vision windshields wherein the thin resilient band portion 11, of the device is inserted through the slot between the upper windshield section 9, and lower windshield section 10, one of the sections being first moved into a tilted position to permit attachment of the device. The operation is identical with that described in the foregoing instance, the operator merely sliding the entire device from one end of the windshield to the other by means of the wing plate 6, on the interior side of the windshield. The guard shown in Figs. 5 and 6, for the squeegee is capable of ready attachment and detachment over the channel portion 2, to effectually inclose the squeegee therein to protect the same when the device is not in use.

I am aware that various details of construction may be varied through a wide range without departing from the principles of this invention, and I therefore do not purpose limiting the patent granted otherwise than necessitated by the prior art.

I claim as my invention:

1. A windshield cleaner comprising a channel portion, a rubber squeegee mounted therein, a flat curved portion integral with said channel portion, an extension integral with said flat portion, a roller supported thereby, and a wing guard plate, rigidly secured on said extension engaging around said roller and adapted when the device is mounted on the windshield to operate the same slidably therealong from the interior side thereof to move the squeegee over the exterior surface of the glass.

2. A windshield cleaner of the class described adapted for connection over the upper margin of the windshield or through the gap between the upper and lower sections of the windshield comprising an exterior channel portion, a cleaning strip mounted therein, an inner operating portion, a roller connected therewith, a resilient thin strip connecting said inner and outer portions of the device acting normally to impel the same toward one another to hold the same attached upon the glass of the windshield, and a wing plate surrounding and guarding said roller and adapted to be used as a handle for moving the cleaner across the windshield to clean the same.

3. A windshield cleaner comprising a channel portion, a rubber squeegee mounted therein, a flat curved resilient portion integral with said channel portion, a tubular extension integral with said flat portion, said respective channel and tubular portions normally impelled toward one another by the resiliency of said flat portion, a pin inserted into said tubular portion, a roller journaled thereon, a plate rigidly engaged on said pin to hold said roller in position, and a guard integrally formed on said plate surrounding and guarding said roller, said plate adapted when the cleaner is mounted on the windshield to afford a means for operating the cleaner across the windshield from the interior side thereof to move the squeegee over the exterior surface of the windshield to clean the same.

In testimony whereof I have hereunto subscribed my name in the presence of two subscribing witnesses.

RAYMOND H. OWEN.

Witnesses:
CHARLES W. HILLS, Jr.,
EARL M. HARDINE.

Copies of this patent may be obtained for five cents each, by addressing the "Commissioner of Patents, Washington, D. C."